(12) United States Patent
Osoreda et al.

(10) Patent No.: US 11,612,154 B2
(45) Date of Patent: Mar. 28, 2023

(54) FISHING ROD

(71) Applicant: Shimano Inc., Osaka (JP)

(72) Inventors: Yasuyuki Osoreda, Osaka (JP);
Hironori Takahashi, Osaka (JP);
Takahiro Yamanaka, Osaka (JP)

(73) Assignee: Shimano Inc., Osaka (JP)

( * ) Notice: Subject to any disclaimer, the term of this patent is extended or adjusted under 35 U.S.C. 154(b) by 17 days.

(21) Appl. No.: 17/062,906

(22) Filed: Oct. 5, 2020

(65) Prior Publication Data
US 2021/0144983 A1 May 20, 2021

(30) Foreign Application Priority Data
Nov. 15, 2019 (JP) .............................. JP2019-207112

(51) Int. Cl.
*A01K 87/08* (2006.01)
*A01K 89/015* (2006.01)

(52) U.S. Cl.
CPC ........ *A01K 87/08* (2013.01); *A01K 89/01925* (2015.05)

(58) Field of Classification Search
CPC ........ A01K 87/08; A01K 87/02; A01K 87/06; A01K 87/00
USPC ..... 43/23, 22, 18.1 R, 18.1 CT; 16/421, 430, 16/431, 436
See application file for complete search history.

(56) References Cited

U.S. PATENT DOCUMENTS

| | | | | |
|---|---|---|---|---|
| 1,033,668 A * | 7/1912 | Brunnett | ................ | A01K 87/08 43/23 |
| 2,997,042 A * | 8/1961 | Mitchell | .............. | A01K 87/085 126/208 |
| 3,466,783 A * | 9/1969 | Priebe, Jr. | .............. | A01K 87/00 43/18.5 |
| 3,522,674 A * | 8/1970 | Hardesty | ................ | A01K 87/06 43/22 |
| 4,578,890 A * | 4/1986 | Childre | ................. | A01K 87/06 43/20 |
| 4,584,787 A * | 4/1986 | Aho | ........................ | A61F 7/034 126/204 |
| 4,601,127 A * | 7/1986 | Maeda | ................... | A01K 87/08 43/18.5 |
| 4,697,376 A * | 10/1987 | Brackett | ................ | A01K 87/08 43/18.1 R |
| 4,817,324 A * | 4/1989 | Brackett | ................ | A01K 87/08 43/18.1 R |
| 4,903,427 A * | 2/1990 | Yamato | .................. | A01K 87/00 43/22 |

(Continued)

FOREIGN PATENT DOCUMENTS

| | | | | |
|---|---|---|---|---|
| CN | 204070214 U | * | 1/2015 | |
| JP | 3057565 B2 | * | 6/2000 | ............ F16B 13/122 |

(Continued)

*Primary Examiner* — Darren W Ark
*Assistant Examiner* — Katelyn T Truong
(74) *Attorney, Agent, or Firm* — Global IP Counselors, LLP

(57) ABSTRACT

A fishing rod includes a rod blank which is configured to be attached to a fishing reel on a lower side. The rod blank includes a main portion and a rear grip portion which is continuous to a rod end side of the main portion. An end surface of the rod blank on the rod end side is inclined such that the lower side extends farther in a direction of the rod end side than the upper side.

17 Claims, 16 Drawing Sheets

(56) References Cited

U.S. PATENT DOCUMENTS

| | | | | | |
|---|---|---|---|---|---|
| 4,916,848 | A | * | 4/1990 | Childre | A01K 87/08 43/20 |
| 4,962,608 | A | * | 10/1990 | Loomis | A01K 87/00 43/18.1 R |
| 4,969,231 | A | * | 11/1990 | Mader | B25G 1/00 81/177.1 |
| 5,337,507 | A | * | 8/1994 | Oyama | A01K 87/08 43/22 |
| 5,390,572 | A | * | 2/1995 | Gakhar | B25G 1/105 81/492 |
| 5,396,727 | A | * | 3/1995 | Furuya | A01K 87/08 43/23 |
| 5,535,539 | A | * | 7/1996 | Vetre | A01K 87/08 43/18.1 R |
| 5,696,339 | A | * | 12/1997 | Brennan | G10D 13/12 84/422.4 |
| 5,832,653 | A | * | 11/1998 | Tsurufuji | A01K 87/002 43/24 |
| 7,690,085 | B2 | * | 4/2010 | Lenhart | A63C 11/222 280/821 |
| 9,232,778 | B1 | * | 1/2016 | De Sernia | A01K 97/10 |
| 2003/0177609 | A1 | * | 9/2003 | Bigolin | B62K 21/26 16/421 |
| 2009/0320352 | A1 | * | 12/2009 | Underwood | A01K 87/00 43/18.1 R |
| 2010/0218347 | A1 | * | 9/2010 | Lenhart | A63C 11/2224 16/421 |
| 2014/0173967 | A1 | * | 6/2014 | Iwata | A01K 87/08 43/18.1 R |
| 2014/0366327 | A1 | * | 12/2014 | Huang | A01K 87/08 16/421 |
| 2015/0150344 | A1 | * | 6/2015 | Lenhart | A63C 11/2224 16/421 |

FOREIGN PATENT DOCUMENTS

| | | | | |
|---|---|---|---|---|
| JP | | 6494568 | B2 | 3/2019 |
| JP | | 2019050745 | A * | 4/2019 |
| WO | WO-2019221614 | A1 * | 11/2019 | A01K 87/02 |

* cited by examiner

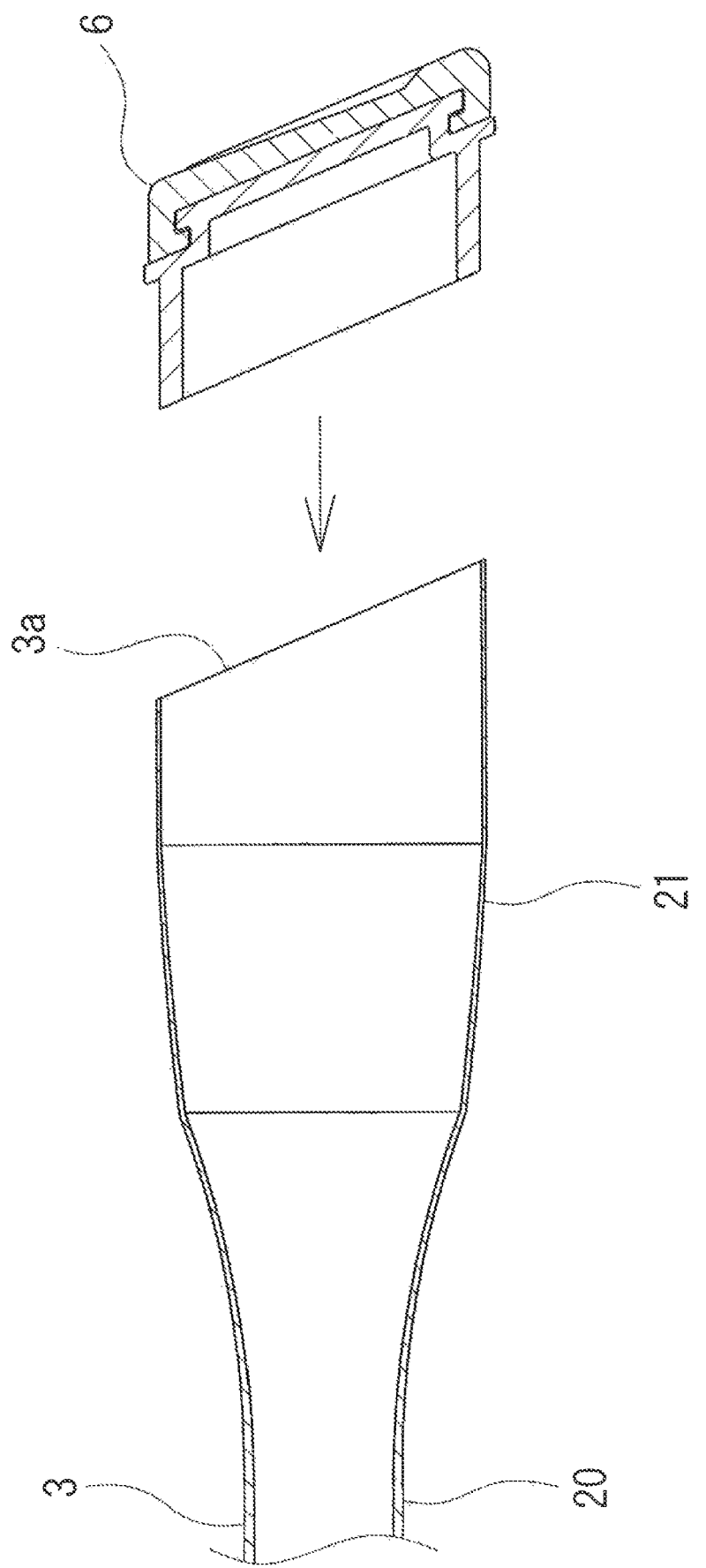

FISHING ROD

CROSS-REFERENCE TO RELATED APPLICATIONS

This application claims priority to Japanese Patent Application No. 2019-207112, filed on Nov. 15, 2019. The entire disclosure of Japanese Patent Application No. 2019-207112 is hereby incorporated herein by reference.

BACKGROUND

Field of the Invention

The present invention relates to a fishing rod that includes a rear grip portion.

Background Art

A fishing rod includes a rear grip portion at the rod end side of the fishing rod relative to a reel seat. In this conventional fishing rod, the rear grip portion is configured separately from the rod blank that forms a part of the rod. That is, the rear grip portion is placed on the outer periphery of the rod blank. For example, when an angler holds the fishing rod with their right hand, the angler can place their right arm on the rear grip portion when a fish is caught. The angler can support the fishing rod with their right palm and their right arm.

Additionally, in one configuration, a rear grip portion is integrally formed with a rod blank, as in Japanese Patent No. 6494568. When the rear grip portion is integrally formed with the rod blank in this way, the sensitivity transmitted from the fishing rod to the hand is improved.

SUMMARY

It has been found that the conventional fishing rods have drawbacks and an improved rear grip section is desired. For example, when the rear grip section is separate from the rod blank, the sensitivity transmitted from the fishing rod to a hand is decreased. Also, some anglers hold the rear grip portion with the left hand and double-handed cast. However, it has been found that some rods have made the length of the rear grip portion to be short so as to trim the weight of the fishing rod. This shortened rear grip portion can cause difficulty in holding the rear grip portion with the left hand.

An object of the present invention is to provide a fishing rod with high sensitivity, reduced weight and a rear grip portion that is easy to grip.

The fishing rod according to the present invention has a rod blank. A reel can be attached to the lower side of the rod blank. The rod blank has a main portion and a rear grip portion at a rod end side relative to the reel. The rear grip portion is continuous to the rod end side of the main portion. An end surface of the rod blank on the rod end side is inclined such that a lower side of the rear grip portion extends farther in a direction of the rod end side than the upper side.

According to this configuration, the reel (for example, a spinning reel) is attached to the lower side of the rod blank, and thus the reel is located on the lower side of the fishing rod. When the fishing rod is held in the right hand, for example, double-handed casting can be performed by holding the rear grip portion with the left hand. The thumb of the left hand abuts the upper portion of the rear grip portion, and at least one finger from the index finger to the little finger of the left hand abuts the lower portion of the rear grip portion. It is preferable that two to four fingers from the index finger to the little finger of the left hand abut the lower portion of the rear grip portion, and it is more preferable that all of the fingers from the index finger to the little finger of the left hand abut the lower portion of the rear grip portion. Alternatively, it is more preferable that three fingers from the index finger to the ring finger of the left hand abut the lower portion of the rear grip portion.

As can be understood, the end surface of the rod blank on the rod end side is inclined such that the lower side of the rear grip portion extends farther in a direction of the rod end side than the upper side, that is, the lower portion of the rear grip portion extends more in the direction of the rod end side than the upper portion of the rear grip portion. Thus, it is possible to place many fingers on the lower portion of the rear grip portion, when holding the rear grip portion with the left hand. Thus, even when the length of the rear grip portion is shortened, the gripping force can be ensured.

A fishing rod according to another embodiment of the present invention has a rod blank. A reel can be attached to the upper side of the rod blank. The rod blank has a main portion and a rear grip portion at the rod end side relative to the reel. The rear grip portion is continuous to the rod end side of the main portion. An end surface of the rod blank on the rod end side is inclined such that a lower side of the rear grip portion extends farther in a direction of the rod end side than the upper side.

According to this configuration, the reel (for example, a double bearing reel) is attached to the upper side of the rod blank, and thus is located on the upper side of the fishing rod. As in the case of the above-mentioned fishing rod to which the reel is attached to its lower side, many fingers can be brought into contact with the lower portion of the rear grip portion when holding the rear grip portion with the left hand. Thus, even when the length of the rear grip portion is shortened, the gripping force can be ensured.

Preferably, the fishing rod has an end cap. The end cap is attached to the end of the rod blank on the rod end side. The end surface of the end cap on the rod end side is inclined such that the lower side extends farther in a direction of the rod end side than the upper side. According to this configuration, the fishing rod can be smoothly inserted into a rod holder or a fishing rod bag. Additionally, it is possible to easily grasp the orientation of the fishing rod in the circumferential direction, due to the end surface of the end cap on the rod end side.

Preferably, the end cap has a guard wall which projects to the rod end side at least in the lower portion of the periphery of the end surface of the end cap on the rod end side. The projection amount of the guard wall gradually increases towards the lower side. According to this configuration, the guard wall can effectively protect the lower portion of the end surface of the rod blank on the rod end side and also the lower portion of the end cap.

Preferably, the width of the guard wall gradually widens towards the lower side. According to this configuration, the guard wall can effectively protect the lower portion of the end surface of the rod blank on the rod end side and also the lower portion of the end cap.

In one embodiment, the end cap has a base surface on the end surface on the rod end side of the end cap. The guard wall is located around the base surface. The inclined angle of the base surface relative to the plane orthogonal to the centerline of the main portion is smaller than the inclined angle of the end surface on the rod end side of the guard wall relative to the orthogonal plane. According to this configuration, the guard wall can project with respect to the base surface and the projection amount of the guard wall can be increased towards the lower side.

The fishing rod according to an embodiment of the present invention has a rod blank and an end cap. A reel can be attached to the lower side of the rod blank. The end cap is attached to the end of the rod blank on the rod end side. The rod blank has a main portion and a rear grip portion at the rod end side relative to the reel. The rear grip portion is continuous to the rod end side of the main portion. A end surface of the end cap on the rod end side is inclined such that the lower side extends farther in a direction of the rod end side than the upper side.

According to this configuration, the reel (for example, a spinning reel) is attached to the lower side of the rod blank, and thus the spinning reel can be located on the lower side of the fishing rod. As in the above-mentioned fishing rod, it is possible to place many fingers on the lower portion of the rear grip portion, when holding the rear grip portion with the left hand. Also, one of the fingers can abut the lower portion of the end cap. For example, three fingers from the index finger to the ring finger of the left hand can abut the lower portion of the rear grip portion and the little finger can abut the lower portion of the end cap. Therefore, even when the length of the rear grip portion is shortened, the gripping force can be ensured.

Another embodiment of a fishing rod according to the present invention has a rod blank and an end cap. A reel can be attached to the upper side of the rod blank. The end cap is attached to the end of the rod blank on the rod end side. The rod blank has a main portion and a rear grip portion at the rod end side relative to the reel. The rear grip portion is continuous to the rod end side of the main portion. An end surface of the rod blank on the rod end side is inclined such that the lower side extends farther in a direction of the rod end side than the upper side.

According to this configuration, the reel (for example, a double bearing reel) is attached to the upper side of the rod blank, and thus the double bearing reel is located on the upper side of the fishing rod. As in the above-mentioned fishing rod, it is possible to place many fingers on the lower portion of the rear grip portion, when holding the rear grip portion with the left hand. Also, a finger can abut the lower portion of the end cap. For example, three fingers of the index finger to the ring finger of the left hand can abut the lower portion of the rear grip portion and the little finger can abut the lower portion of the end cap. Therefore, even when the length of the rear grip portion is shortened, the gripping force can be ensured.

As described above, it is possible to increase the sensitivity of the rear grip portion, to reduce the weight of the rear grip portion and to easily hold the rear grip portion.

BRIEF DESCRIPTION OF THE DRAWINGS

FIG. 16 is an enlarged longitudinal sectional view of the relevant part showing a state of the fishing rod in manufacturing process.

DETAILED DESCRIPTION OF EMBODIMENTS

Figure 1:
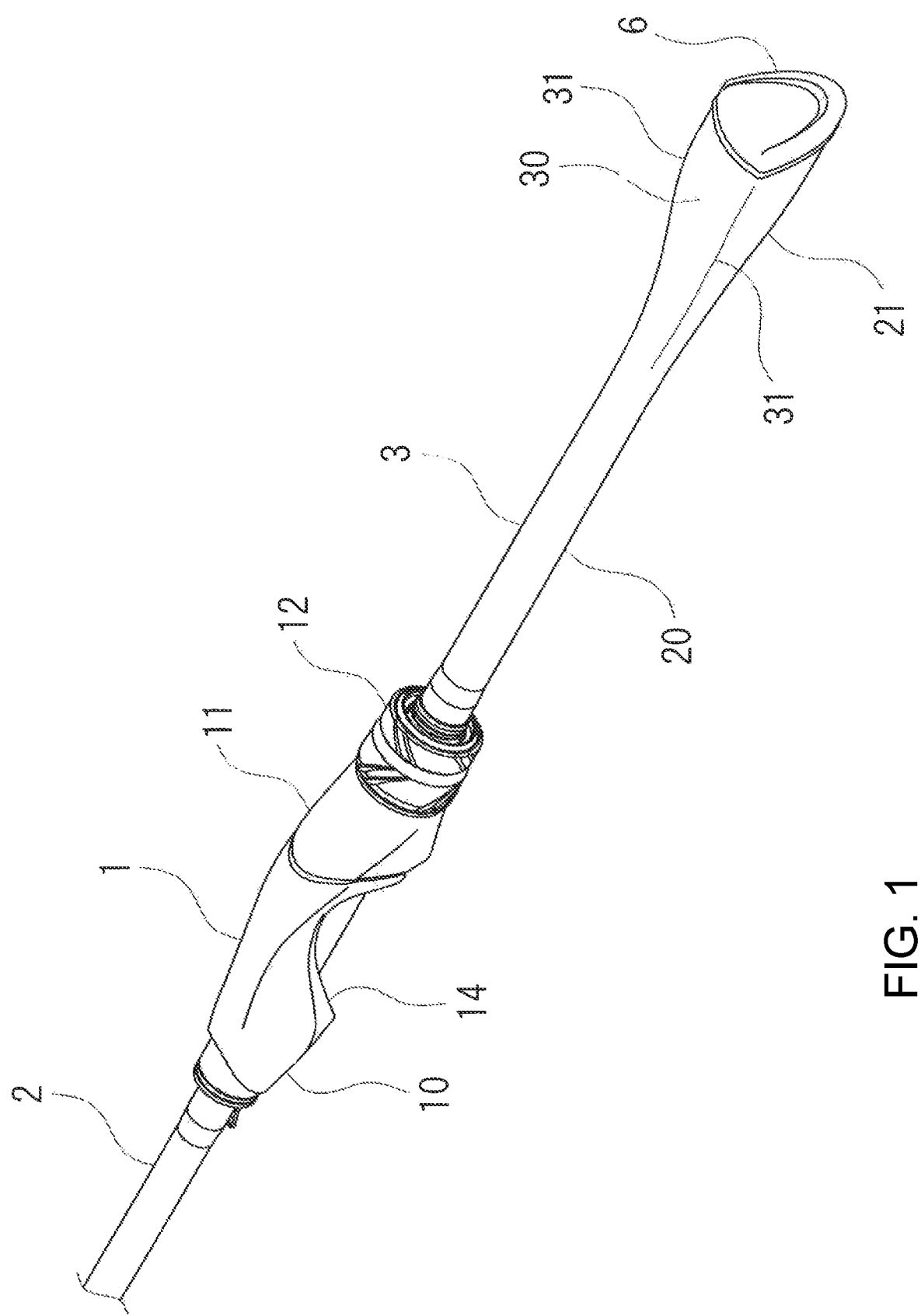
FIG. 1 is a perspective view showing the relevant part of a fishing rod in one embodiment of the present invention.
Figure 2:
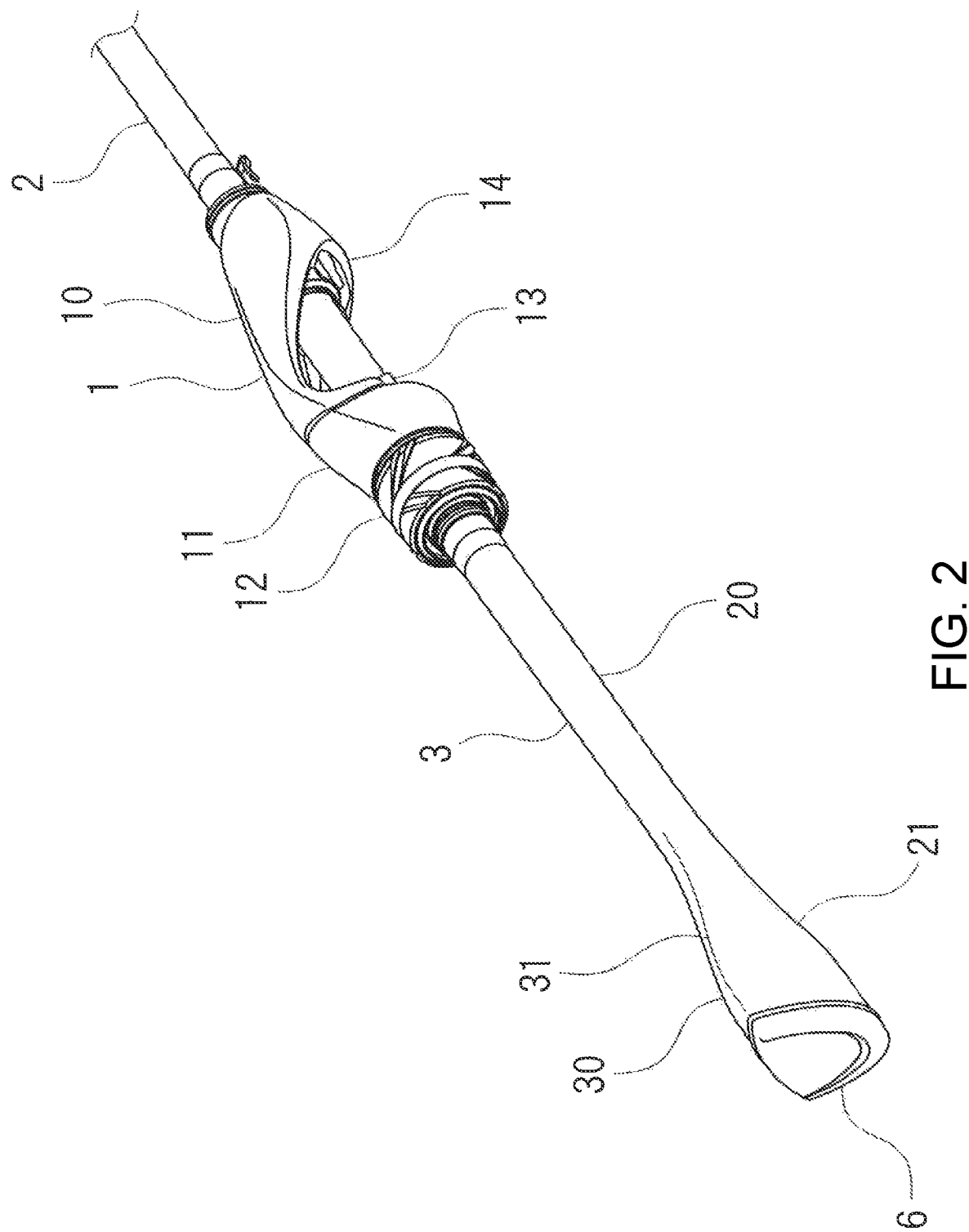
FIG. 2 is a perspective view showing the relevant part of the fishing rod.
Figure 3:
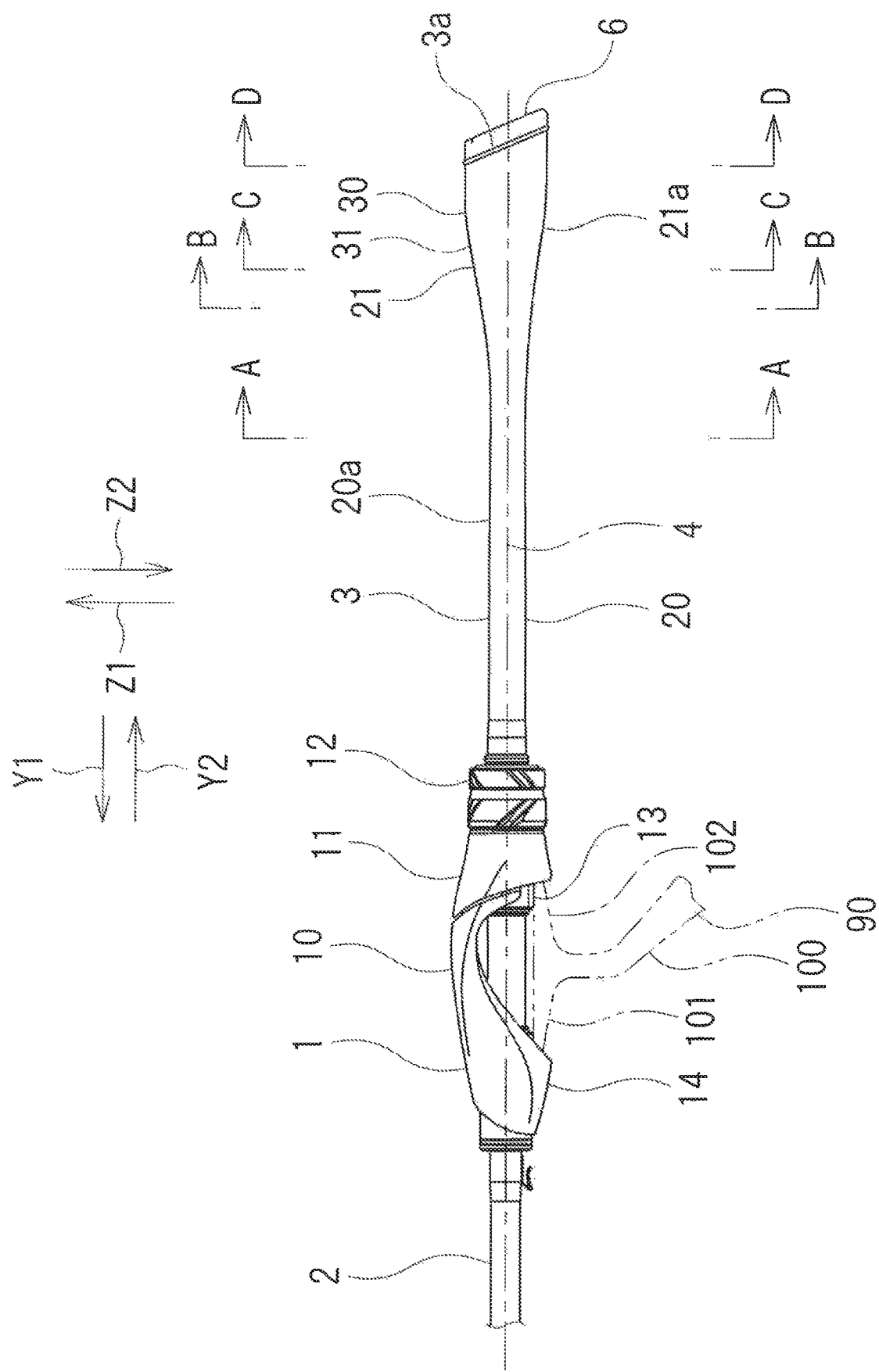
FIG. 3 is a front view showing the relevant part of the fishing rod.

A fishing rod according to one embodiment of the present invention will be described below with reference to FIGS. 1 to 13. The type of the fishing rod can be any suitable fishing rod, for example the fishing rod can be a connecting rod, a telescopic rod, a one-piece rod and such. As shown in FIGS. 1-3, the fishing rod according to the embodiment has a rod body and a reel seat 1. The reel seat 1, in the present embodiment, is mounted on the rod body and is suitable for and configured to have a spinning reel 90 attached thereto. The spinning reel 90 includes a reel leg 100 for attaching the spinning reel 90 to the reel seat 1. The reel leg 100 has a first leg part 101 and a second leg part 102. The reel seat 1 has a reel mounting surface 13 to which the reel leg 100 is attached. The rear surface of the reel leg 100 abuts on the reel mounting surface 13. The spinning reel 90 is located on the lower side of the fishing rod and the reel mounting surface 13 faces down when the spinning reel is in use and attached to the fishing rod. In the embodiment in which the spinning reel 90 is used, the lower side is the reel mounting side and the upper side is the opposite side of the reel mounting side in the radial direction.

Figure 4:
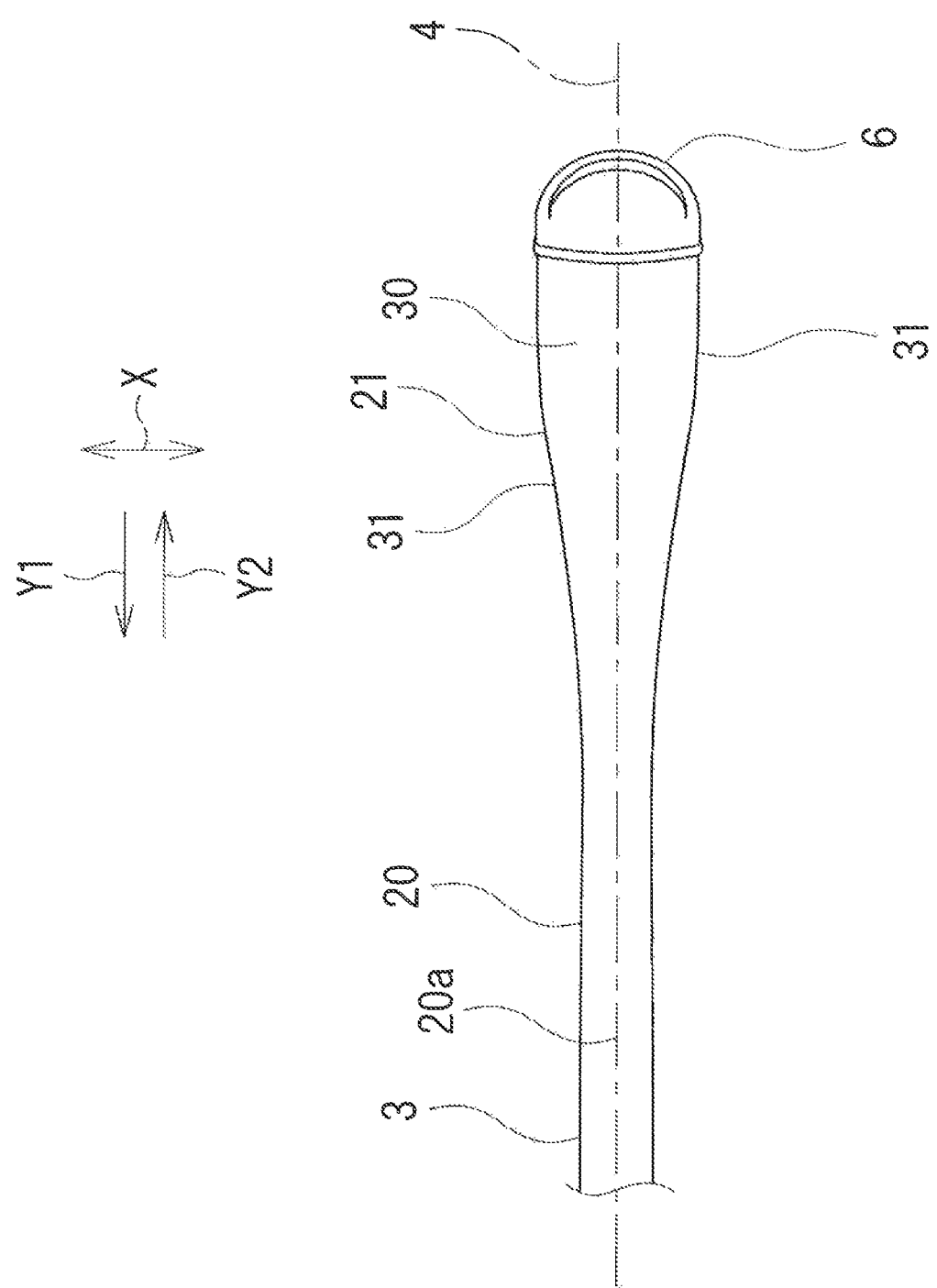
FIG. 4 is a plan view showing the relevant part of the fishing rod.

The direction of the centerline of the fishing rod is the longitudinal direction and the rod tip side is the front side and the rod end side is the rear side. The side of the reel mounting surface 13 is the lower side and the opposite side of the reel mounting surface 13 in the radial direction is the upper side. FIG. 4 is a plan view of the fishing rod viewed from the upper side. When viewing the fishing rod from the upper side, the direction orthogonal to the longitudinal direction is the right-and-left direction. In the figures, the right-and-left direction is shown with the arrow X, the front side is shown with the arrow Y1, the rear side is shown with the arrow Y2, the upper side is shown with the arrow Z1 and the lower side is shown with the arrow Z2.

The reel seat 1 is tubular is tubular and is attached to the rod body, generally by inserting the rod body into the seal seat 1. The reel seat 1 can also be referred to as a pipe seat. The reel seat 1 is immovably fixed at a predetermined position of the rod body by attaching the reel seat to the outer periphery of the rod body directly or via a tubular spacer.

The reel seat 1 includes a reel seat body 10, a movable hood 11 and a nut 12. The rod body is inserted into the reel seat body 10. The reel seat body 10 has the reel mounting surface 13 and a fixed hood 14. The fixed hood 14 is integrally formed with the reel seat body 10. The first leg part 101 of the reel leg 100 faces the front side and the second leg part 102 faces the rear side in the state in which the spinning reel 90 is attached to the reel seat 1. The fixed hood 14 holds the first leg part 101 of the reel leg 100. The movable hood 11 is movable in a back-and-force direction relative to the reel seat body 10. The movable hood 11 holds the second leg part 102 of the reel leg 100. The nut 12 is screwed on the reel seat body 10. The nut 12 moves the movable hood 11 in the back-and-forth direction and fixes the movable hood 11 on the desired position. In this embodiment, the nut 12 is located on the rear side of the reel seat body 10. However, the nut 12 can be located on the front side of the reel seat body 10.

The rod body comprises one rod blank or a plurality of rod blanks (rod body). In this embodiment, the rod body includes a first rod blank 2 and a second rod blank 3. The first rod blank 2 is located on the front side of the second rod blank 3. The first rod blank 2 and the second rod blank 3 are joined integrally to each other. For example, the first rod blank 2 and the second rod blank 3 are joined to each other, inside of the reel seat body 10. The first rod blank 2 and the second rod blank 3 are joined to form an overlapping portion which has a predetermined length, for example. Meanwhile, the first rod blank 2 and the second rod blank 3 can be detachably connected to each other.

The second rod blank 3 is formed in a hollow shape by winding prepreg on a mandrel and firing. Carbon fiber or glass fiber can be used as reinforcing fiber of the prepreg. The second rod blank 3 extends from the reel seat 1 towards the rear side. The second rod blank 3 extends to the rear end of the fishing rod. The second rod blank 3 has a main portion 20 and a rear grip portion 21. The main portion 20 and the rear grip portion 21 are integrally formed with the second rod blank 3. The front portion of the main portion 20 is located inside of the reel seat 1. The main portion 20 extends from the reel seat 1 towards the rear side. The main portion 20 is a cylinder. The centerline 4 of the main portion 20 is the centerline of the second rod blank 3 and the centerline of the fishing rod. The surface orthogonal to the centerline 4 of the main portion 20 is referred to as an orthogonal plane. The normal line of the orthogonal plane is the centerline 4 of the main portion 20. The orthogonal plane is orthogonal to the longitudinal direction. The cross-sectional surface in which the second rod blank 3 is cut along the orthogonal plane is referred to as a transverse sectional surface and the cross-sectional shape is referred to as a transverse sectional shape. The transverse sectional shape of the main portion 20 is a circular shape. The main portion 20 preferably has a straight shape with a substantially constant diameter.

The rear grip portion 21 is continuous to the rear side of the main portion 20. The arm of the hand holding the fishing rod can be placed on the rear grip portion 21 or the rear grip portion 21 can be held with the opposite hand from the hand holding the reel seat 1 when casting with both hands. In the following, the situation in which the fishing rod is held with the right hand will be described as an example. When holding the fishing rod with the right hand, the right arm (including the elbow) is placed on the rear grip portion 21. When casting with both hands, i.e., when performing a double-handed casting, the right hand holds the reel seat 1 and the left hand holds the rear grip portion 21.

The rear grip portion 21 extends to the rear end of the second rod blank 3. The rear grip portion 21 is thicker than the main portion 20. In other words, the rear grip portion 21 expands radially further than the main portion 20. The rear grip portion 21 is spaced apart from the reel seat 1 to the rear side. In this embodiment, the rear grip portion 21 is shorter than the main portion 20. The length of the rear grip portion 21 is long enough for the left hand to hold. The length of the rear grip portion 21 is preferably a length that corresponds to at least three or more fingers among the four fingers from the index finger to the little finger of a general size hand of an adult.

The transverse sectional shape of the rear grip portion 21 is a non-circular shape. The rear grip portion 21 increasingly gradually expands in the radial direction towards the rear side. The rear grip portion 21 has an expanded section which continues from the rear side of the main portion 20 and gradually expands towards the rear side and a straight section which continues to the rear side of the expanded section, extends up to the rear end of the rear grip portion 21 and maintains a constant shape without expanding towards the rear side. An end cap 6 which will be described later, is attached to the straight section. It is preferable for the rear grip portion 21 to have a straight section. However, the straight section can be omitted.

Figure 9A:
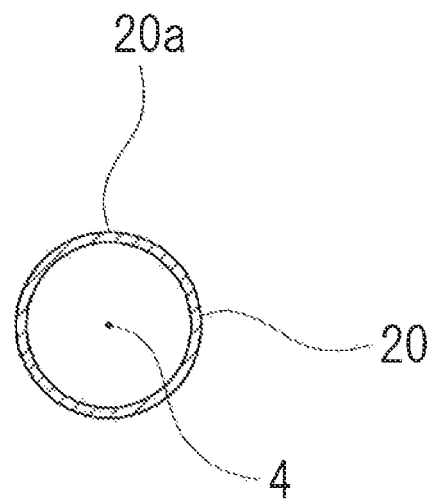
FIG. 9A is an A-A end elevational view of FIG. 3.
Figure 9B:
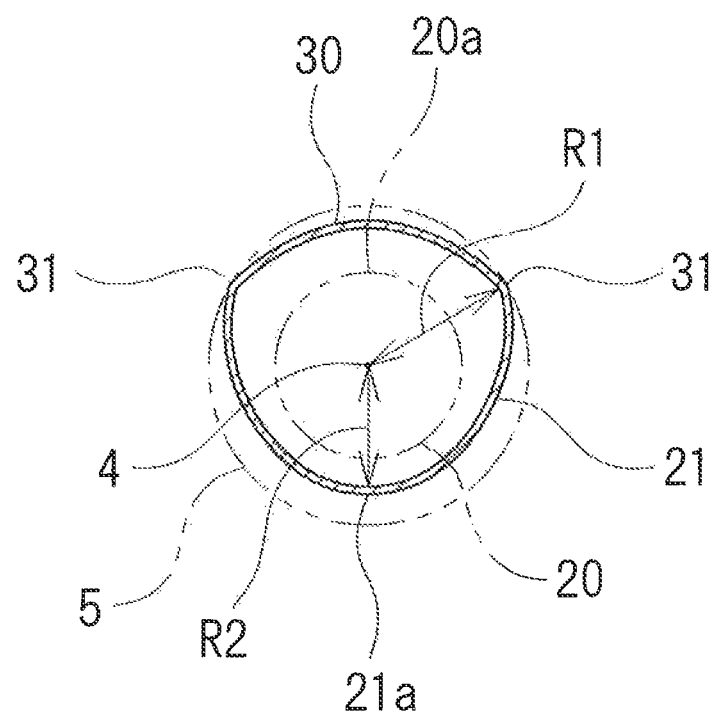
FIG. 9B is a B-B end elevational view of FIG. 3.
Figure 10A:
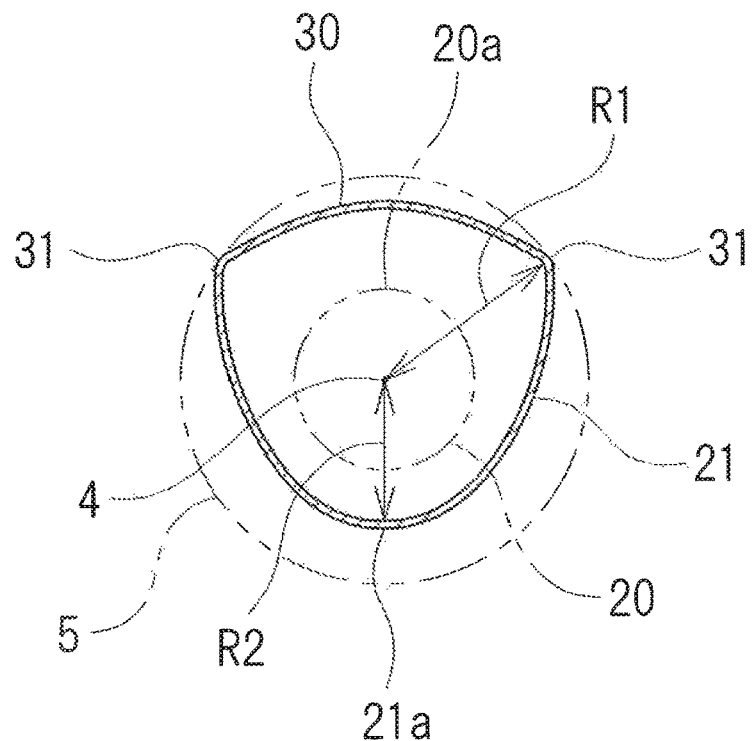
FIG. 10A is a C-C end elevational view of FIG. 3.
Figure 10B:
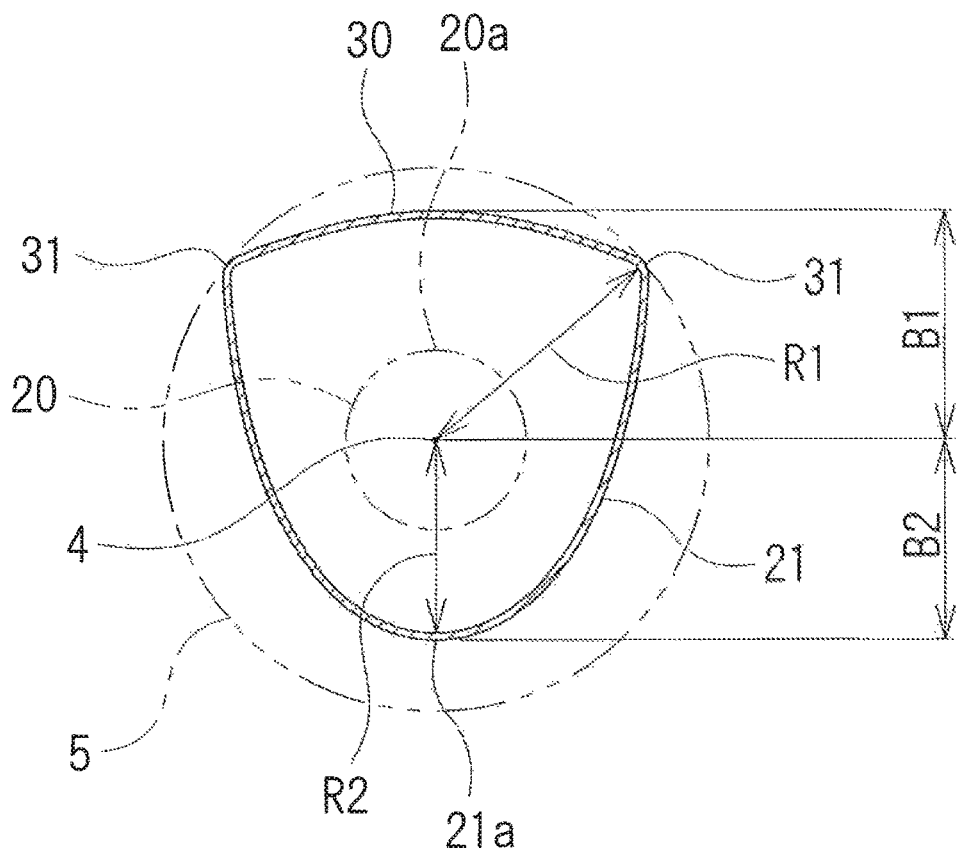
FIG. 10B is a D-D end elevational view of FIG. 3.
Figure 11:
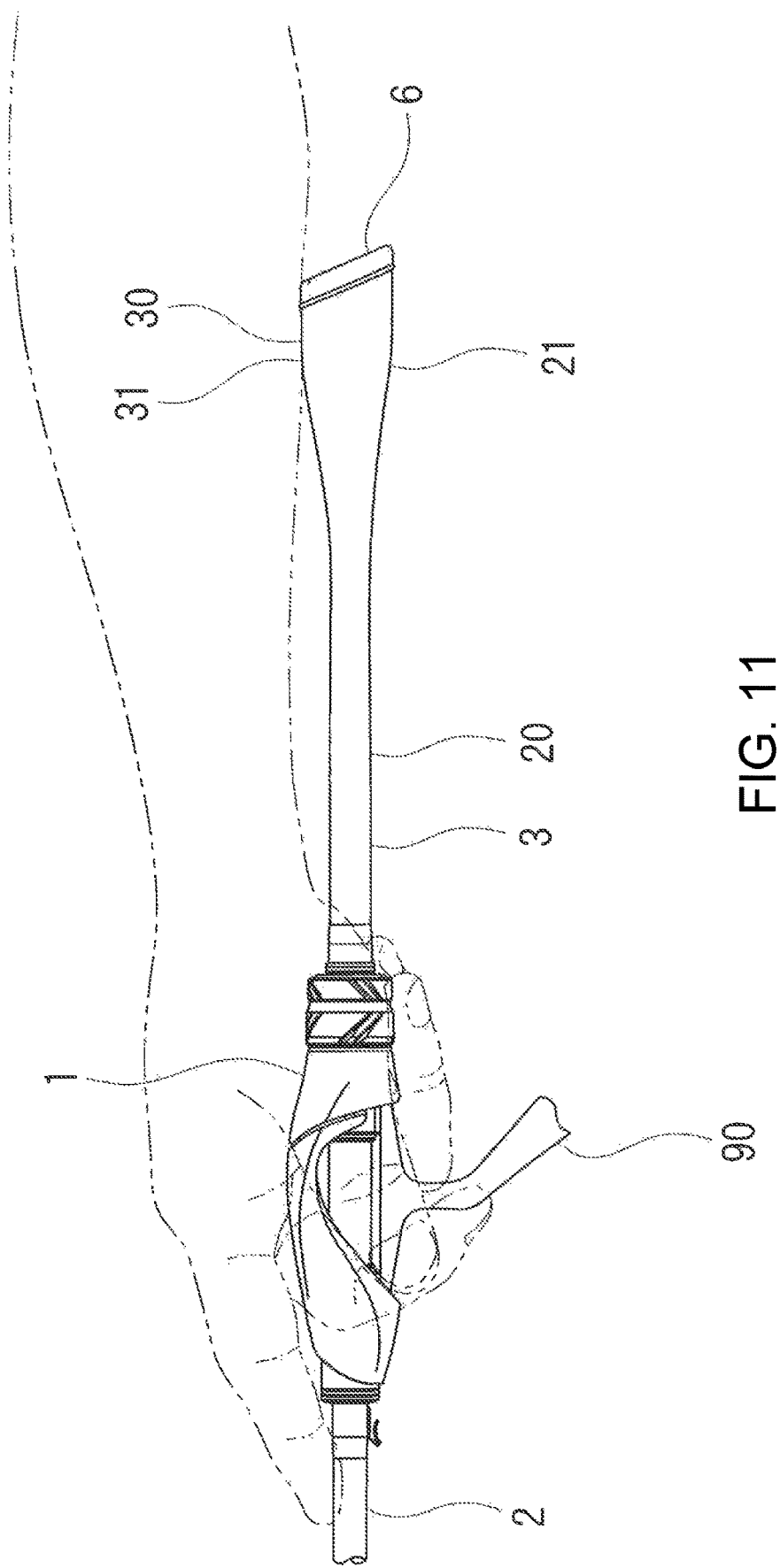
FIG. 11 is a front view of the relevant part showing a state in which the fishing rod is being used.

The transverse sectional shape of the rear grip portion 21 is shown in FIGS. 9B, 10A and 10B. In FIGS. 9B, 10A and 10B, the outer periphery of the main portion 20 is indicated by a chain double-dashed line and a virtual circle 5 with a radius that is the distance R1 between the centerline 4 of the main portion 20 and the both of left and right corners 31, is indicated by a chain double-dashed line. The FIG. 9A shows the transverse sectional shape of the main portion 20. As mentioned above, the transverse sectional shape of the main portion 20 is circular. On the other hand, the transverse sectional shape of the rear grip portion 21 is not a circular shape but a bilaterally symmetrical non-circular shape. In detail, the transverse sectional shape of the rear grip portion 21 is an inverted triangle. The transverse sectional shape of the second rod blank 3 transforms from a circular shape to an inverted triangular shape from the main portion 20 to the rear trip section 21. As shown in FIG. 10B, the expansion amount B1 towards the upper side is larger than the expansion amount B2 towards the lower side at least on the rear portion of the rear grip portion 21.

The rear grip portion 21 includes a pair of left and right corners 31, an upper surface 30 and a lower surface. In this embodiment, the rear grip portion 21 has a pair of left and right corners 31, however, the rear grip portion 21 can have only one corner 31. Since a pair of left and right corners 31 are disposed on the rear grip portion 21, the entire circumference of the rear grip portion 21 is divided into two sections in the circumferential direction. The upper portion of the divided sections is the upper surface 30 and the lower portion is the lower surface. The lower surface is the section where the upper surface 30 is omitted from the entire circumference of the rear grip portion 21. The upper surface 30 is located between the pair of left and right corners 31 and positioned in the upper side of the circumference of the rear grip portion 21. The lower surface is located between the pair of the left and right corners 31 and positioned in the lower side of the circumference of the rear grip portion 21. The radius of curvature of the upper surface 30 in the circumferential direction is preferably different from the radius of curvature of the lower surface in the circumferential direction. The radius of curvature of the upper surface 30 in the circumferential direction is preferably larger than the radius of curvature of the lower surface in the circumferential direction.

The upper surface 30 is the upper surface of the rear grip portion 21. The corners 31 are formed respectively on both ends of the upper surface 30 in the circumferential direction. The arm of the hand holding the fishing rod, that is, the right hand can be placed on the upper surface 30. In the planar view such as FIG. 4, the upper surface 30 is wider than the diameter of the main portion 20. The upper surface 30 gradually widens towards the rear side. As shown in FIG. 3, the upper surface 30 also gradually rises towards the rear side. As shown in FIGS. 9B, 10A and 10B, the upper surface 30 is a convex curved surface which is curved radially outward along the circumferential direction. The radius of curvature of the upper surface 30 in the circumferential direction is larger than the radius of the virtual circle 5 passing the pair of corners 31 with the centerline 4 of the main portion 20 as the center. The radius of curvature of the upper surface 30 in the circumferential direction is large and the upper surface 30 is a curved surface which is close to a plane and is an approximate plane surface. The radius of the curvature of the upper surface 30 in the circumferential direction is larger than the radius of the virtual circle 5. As shown in FIGS. 10A and 10B, the upper surface 30 is located higher than the top 20a of the main portion 20 at least on the rear portion of the rear grip portion 21.

The corner 31 is the portion where the radius of curvature in the circumferential directions is locally small. The radius of curvature of the corner in the circumferential direction is the smallest of the entire circumference of the rear grip portion 21. The corner 31 is a streak that extends from the front side to the rear side. In the planar view, the corners 31 are located on the end portions in right-and-left direction. The distance between both corners 31 is the size and the width of the rear grip portion 21 in right-and-left direction. The distance between both corners 31 gradually increases towards the rear side. The outer periphery of the rear grip portion 21 is vertically separated by the left and right corners 31. Among the two portions of the outer periphery of the rear grip portion 21, that are vertically separated by the left and right corners 31, the upper portion is the upper surface 30. The rear grip portion 21 has a shape in which the width gradually decreases from the pair of corners 31 to the lowermost top 20a of the rear grip portion 21. The transverse sectional shape of the rear grip portion 21 is an inverted triangle. The lowermost top 20a of the rear grip portion 21 is the vertex of the lower side of the inverted triangle. In a transverse sectional view, the lowermost top 20a of the rear grip portion 21 has a distance R2 from the centerline 4 of the main portion 20 to the lowermost top 20a of the rear grip portion 21.

As shown in FIGS. 10A and 10B, the pair of corners 31 is located radially outward and higher relative to the top 20a of the main portion 20 at least in the rear portion of the rear grip portion 21. The virtual circle 5 is larger than the outer periphery of the main portion 20. In the transverse sectional view, the diameter of the virtual circle 5 is larger than the outer diameter of the main portion 20. In the rear portion of the rear grip portion 21, the diameter of the virtual circle 5 is at least more than twice the outer diameter of the main portion 20. Additionally, as in FIGS. 9A, 10A and 10B, in the transverse sectional view, the pair of corners 31 is most distant from the centerline 4 of the main portion 20 in the radial direction out of entire circumference of the rear grip portion 21. In the transverse sectional view, the distance R1 (radius) from the centerline 4 of the main portion 20 to the pair of corners 31 is larger than the distance R2 (radius) from the centerline 4 of the main portion 20 to the lowermost point 21a of the rear grip portion 21. The distance R1 from the centerline 4 of the main portion 20 to the pair of corners 31 is the radius of the virtual circle 5. The radius of the virtual circle 5 is larger than the distance R2 from the centerline 4 of the main portion 20 to the lowermost top 20a of the rear grip portion 21. Over the entire length of the rear grip portion 21, the pair of corners 31 are most distant from the centerline 4 of the main portion 20 of the entire circumference of the rear grip portion 21 in the radial direction.

A rear end surface 3a of the second rod blank 3 can be parallel to the orthogonal plane. However, in this embodiment, the rear end surface 3a of the second rod blank 3 is inclined in relative to the orthogonal plane. That is, the rear end surface 3a of the second rod blank 3 is an inclined surface. The rear end surface 3a of the second rod blank 3 is inclined such that the lower side is farther rearward than the upper side. In the following, the inclined angle relative to the orthogonal plane is simply referred to as an inclined angle. The inclined angle θ1 of the rear end surface 3a of the second rod blank 3 is, for example, 45 degrees or less.

End Cap 6

Figure 5:
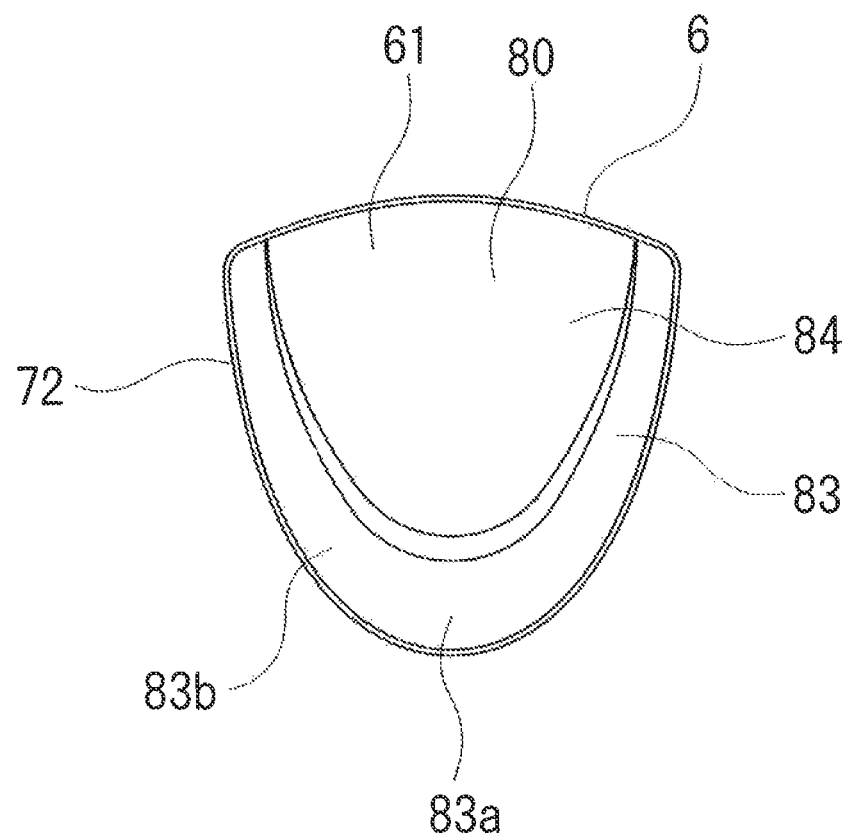
FIG. 5 is a view of the fishing rod from the rod end side.
Figure 6:
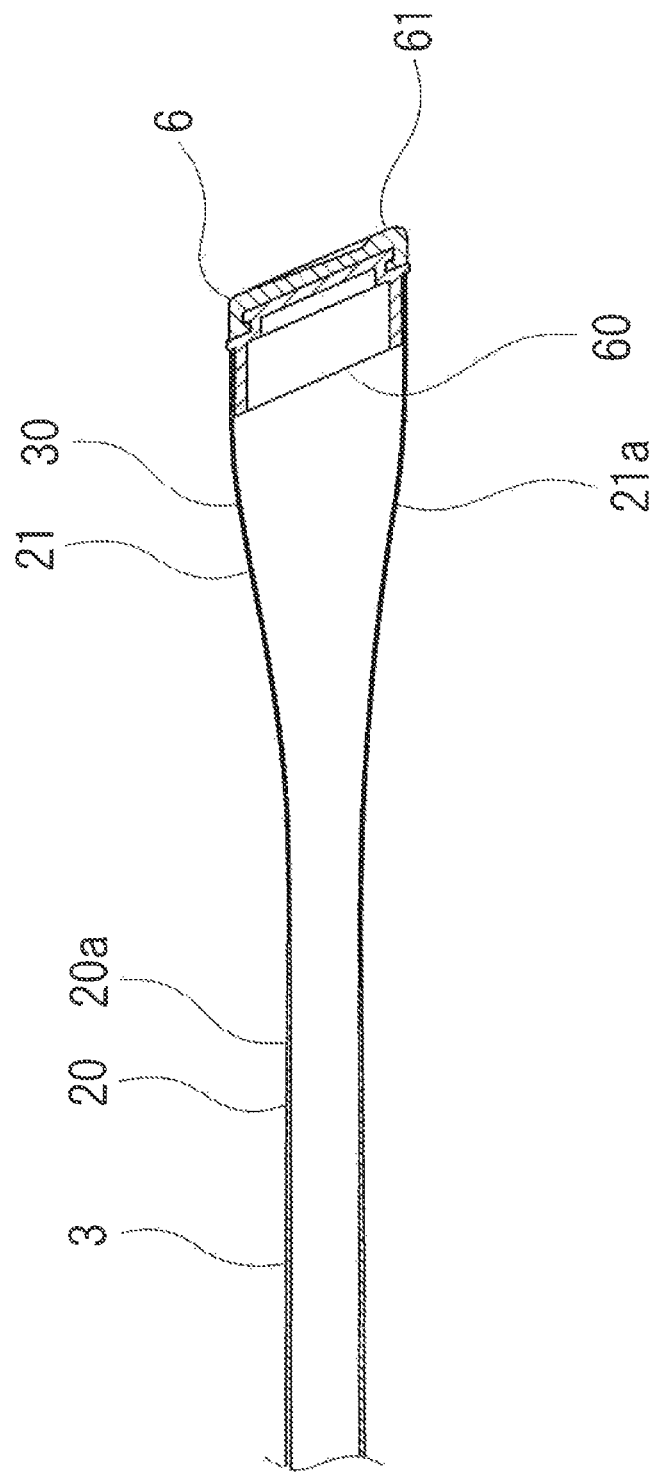
FIG. 6 is a longitudinal sectional view of the relevant part of the fishing rod.

The fishing rod has the end cap 6 on the rear end of the fishing rod. The end cap 6 is attached to the rear end portion of the second rod blank 3. The shape of the end cap 6 when viewed from the rear side corresponds to the transverse sectional shape of the rear end portion of the second rod blank 3. As shown in FIG. 5, the end cap 6 is an inverted triangle when viewed from the rear side.

The end cap 6 includes a cap main body 60 and a cover 61. The cap main body 60 is attached to the second rod blank 3 and the cover 61 is attached to the cap main body 60. The cap main body 60 is preferably made of hard synthetic resin or metal. The cover 61 is preferably softer than the cap main body 60. The cover 61 is preferably made of rubber.

It is preferable for the cap main body 60 to have a cylinder shape. As such, it is preferable for the cap main body 60 to be hollow. It is preferable that the front end of the cap main body 60 is open and the rear end of the cap main body 60 is closed. The cap main body 60 has an cylinder part 70 and an outer cylinder part 71. The cylinder part 70 is inserted inside of the rear end portion of the second rod blank 3. The transverse sectional shape of the cylinder part 70 corresponds to the transverse sectional shape of the rear end portion of the second rod blank 3. The transverse sectional shape of the cylinder part 70 is an inverted triangle. The cylinder part 70 holds the inner periphery of the rear end portion of the second rod blank 3 and prevents the rear end portion of the second rod blank 3 to be crushed and destroyed. The cylinder part 70 is a supporting section which supports the inner periphery of the rear end portion of the second rod blank 3. The cylinder part 70 is adhered to the inner periphery of the second rod blank 3. The front end surface 70a of the cylinder part 70 is inclined such that the upper side is more forward than the lower side. That is, the front end surface 70a of the cylinder part 70 is inclined similarly to the rear end surface 3a of the second rod blank 3. The front end surface 70a of the cylinder part 70 is parallel to the rear end surface 3a of the second rod blank 3. The upper portion of the front end surface 70a of the cylinder part 70 is located in front of the lower portion of the front end surface 70a of the cylinder part 70. The length of the cylinder part 70 is constant over the entire circumference. That is, the length of the portion of the end cap 6 that is inserted inside of the second rod blank 3 is constant over the entire circumference.

The outer cylinder part 71 is continuous to the rear side of the cylinder part 70. The outer cylinder part 71 projects to the rear side from the rear end portion of the second rod blank 3. A flange 72 is formed on the outer periphery of the front end of the outer cylinder part 71. The flange 72 projects outward in the radial direction. It is preferable for the flange 72 to be formed on the entire circumference of the outer cylinder part 71. The flange 72 abuts the rear end surface 3a of the second rod blank 3. Since the flange 72 abuts the rear end surface 3a of the second rod blank 3, the cap main body 60 is not inserted further into the second rod blank 3. The front surface of the flange 72 abuts the rear end surface 3a of the second rod blank 3. The front surface of the flange 72 corresponds to the inclination of the rear end surface 3a of the second rod blank 3, and is thus similarly inclined. The rear end surface 3a of the second rod blank 3 and the front surface of the flange 72 are in surface contact. The rear end surface 3a of the second rod blank 3 and the front surface of the flange 72 are parallel to each other. It is preferable that the flange 72 projects radially outward more than the outer periphery of the second rod blank 3. Since the flange 72 projects more than the outer periphery of the second rod blank 3, a damage to the rear end surface 3a of the second rod blank 3 is effectively prevented. The cover 61 is attached to the outer cylinder part 71 of the cap main body 60. The cover 61 is located rearward of the flange 72. The outer periphery of the rear portion of the outer cylinder part 71 is located one step inward with respect to the outer periphery of the front portion of the outer cylinder part 71. A body convex portion 73 is formed on the outer periphery of the rear end portion of the outer cylinder part 71. The body convex portion 73 projects radially outward. It is preferable that the body convex portion 73 is formed over the entire circumference. The cover 61 is latched on the body convex portion 73.

The shape of the cover 61 corresponds to the transverse sectional shape of the rear end portion of the second rod blank 3. The cover 61 is, as shown in FIG. 5, an inverted triangle when viewed from the rear side. The cover 61 covers a portion of the outer cylinder part 71 of the cap main body 60, that is located rear side of the flange 72. The cover 61 includes a plate-shaped part 80 and a cover cylindrical part 81 which extends from the periphery of the plate-shaped part 80 towards the front side. The plate-shaped part 80 covers the rear end surface of the outer cylinder part 71 of the cap main body 60 from the rear side. The cover cylindrical part 81 covers the outer periphery of the end portion of the outer cylinder part 71 from the outside in the radial direction. The cover projection 82 projects on the inner periphery of the cover cylindrical part 81 towards the inside in the radial direction. The cover projection 82 latches on the main body convex portion 73. Since the cover projection 82 latches on the main body convex portion 73, the cover 61 is attached to the cap main body 60. It is preferable that the flange 72 of the cap main body 60 projects radially outward more than the outer periphery of the cover cylindrical part 81. The rear surface of the plate-shaped part 80 is the rear end surface of the cover 61, the rear end surface of the end cap 6 and the rear end surface of the fishing rod. The rear end surface of the plate-shaped part 80 is inclined such that the lower side is more rearward than the upper side.

As shown in FIG. 5, a guard wall 83 is formed on the periphery of the rear surface of the plate-shaped part 80, and projects rearward. The guard wall 83 can be formed on a part of the periphery of the rear surface of the plate-shaped part 80 or on the entire periphery. The guard wall 83 is formed at least at the lower part of the periphery of the rear surface of the plate-shaped part 80. The guard wall 83 extends along the circumferential direction, and preferably is a protrusion which extends along the circumferential direction. In this embodiment, the guard wall 83 is formed on the portion, except the upper part, of the periphery of the rear surface of the plate-shaped part 80. The rear surface of the plate-shaped part 80 is an inverted triangle, and the guard wall 83 is formed on the remaining two sides of the inverted triangle, and not formed on a side of the upper side. Thus, the guard wall 83 has a V-shape or a U-shape when viewed from the rear side.

The projection amount of the guard wall 83 to the rear side can be constant over the entire length of the guard wall 83. However, in this embodiment, the projection amount gradually increases from the upper portion to the lower portion of the guard wall 83. The projection amount of the guard wall 83 is at a maximum at the lowermost point 83a of the guard wall 83. The width of the guard wall 83 can be constant, however, in this embodiment, the width of the guard wall 83 gradually widens from the upper portion to the lower portion of the guard wall 83. The width of the guard wall 83 is at a maximum at the lowermost point 83a of the guard wall 83.

By forming the guard wall 83 on the periphery of the rear surface of the plate-shaped part 80, the rear surface of the plate-shaped part 80 is divided into a portion where the guard wall 83 is formed and a portion where the guard wall 83 is not formed. The portion where the guard wall 83 is not formed on the rear surface of the plate-shaped part 80 is a base surface 84. The rear surface of the plate-shaped part 80 is constructed from the base surface 84 and the rear surface of the guard wall 83. The guard wall 83 is located around the base surface 84. The base surface 84 can be used as a display surface for providing a selectable display unit. That is, a display unit can be disposed on the base surface 84. The configuration of the display unit can be any suitable configuration. For example, the display unit can be formed by integrally forming irregularities on the base surface 84. The display unit can be formed by printing. A display member, such as a display board, separately attached to the base surface 84 can be the display unit. The guard wall 83 projects rearward with respect to the base surface 84, and the base surface 84 is set back to the front side in relation to the guard wall 83. The base surface 84 is recessed on the front side in relation to the guard wall 83, such that the base surface 84 is guarded by the guard wall 83.

Figure 7:
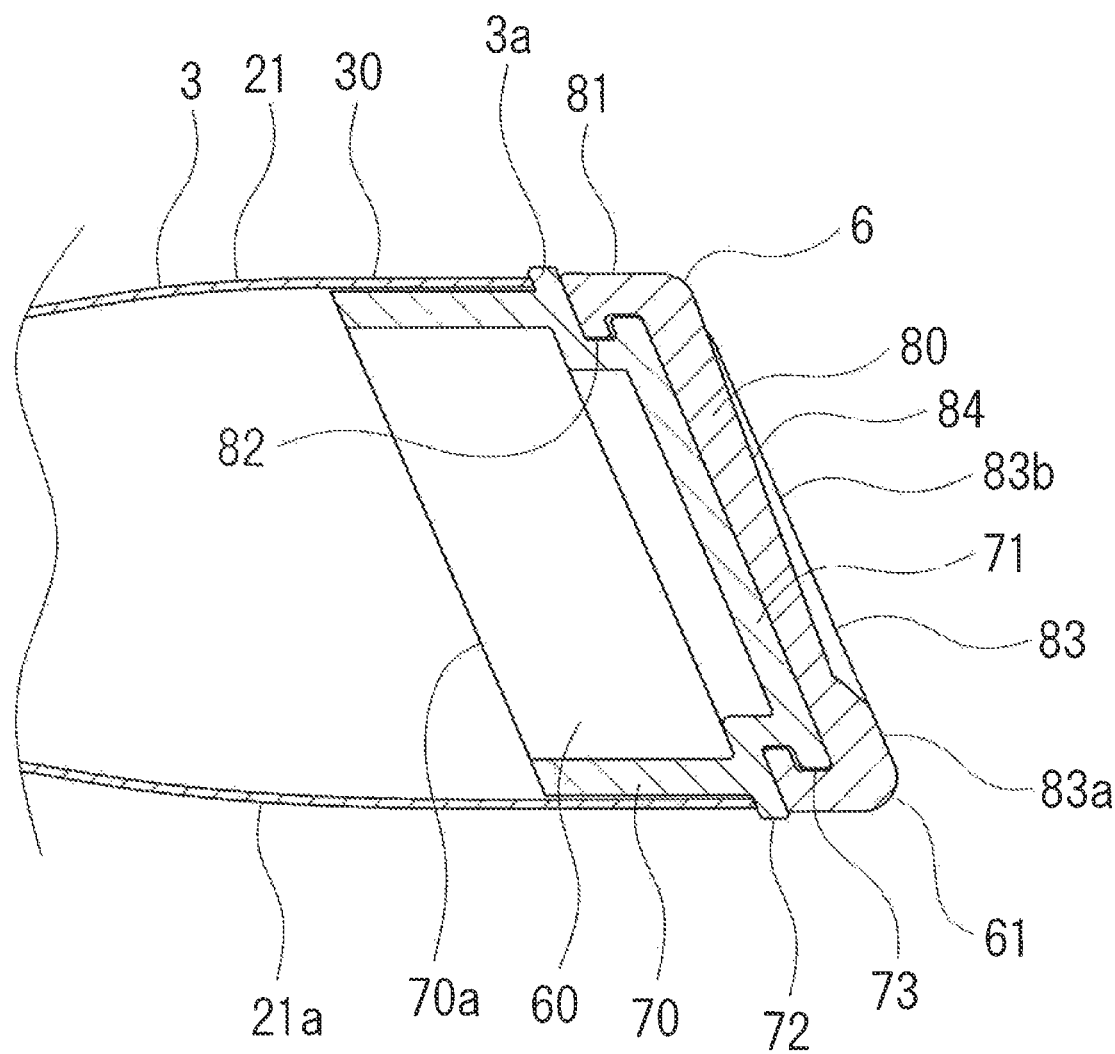
FIG. 7 is an enlarged view of the relevant part of FIG. 6.
Figure 8:
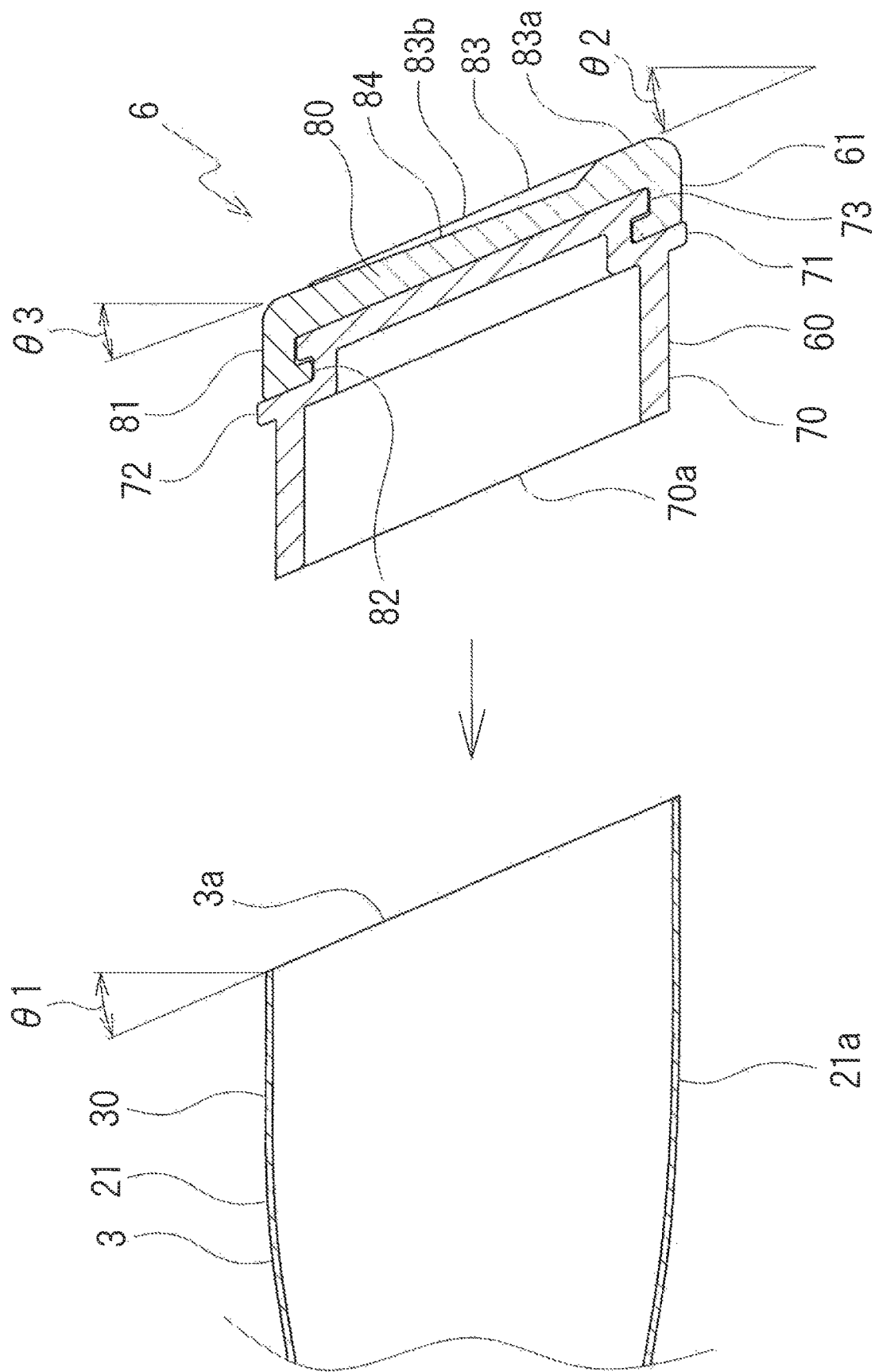
FIG. 8 is an enlarged longitudinal sectional view of the relevant part showing a state of the fishing rod in manufacturing process.

As shown in FIGS. 7 and 8, the rear surface 83b of the guard wall 83 is inclined in relation to the orthogonal surface. The inclined angle θ2 of the rear surface 83b of the guard wall 83 is the same as the inclined angle θ1 of the rear end surface 3a of the second rod blank 3. The base surface 84 is inclined at an inclination angle different from the rear surface 83b of the guard wall 83. The inclined angle θ3 of the base surface 84 is smaller than the inclined angle θ2 of the rear surface 83b of the guard wall 83. Due to the difference between these inclination angles, the guard wall 83 projects relatively rearward with regard to the base surface 84 and the projection amount of the guard wall 83 gradually increases towards the lowermost point 83a of the guard wall 83. The inclined angle θ3 of the base surface 84 is smaller than the inclined angle θ1 of the rear end surface 3a of the second rod blank 3. Meanwhile, the thickness of the portion which corresponds to the base surface 84 of the plate-shaped part 80 gradually thins towards the lowermost point of the base surface 84.

The spinning reel 90 is attached to the fishing rod constructed as described above, as shown in FIG. 11. The spinning reel 90 is attached to the reel mounting surface 13 of the reel seat 1. The reel mounting surface 13 is facing lower side. The spinning reel 90 is located on the lower side of the fishing rod. When the fishing rod is held with a right hand, for example, it is possible to support the fishing rod by placing a right arm on the upper surface 30. The radius of curvature of the upper surface 30 is large and the upper surface 30 is a curved surface which is close to a plane, therefore, it is possible to support the fishing rod by pressing the right arm firmly against the upper surface 30. Thus, the fishing rod is stabilized and the rotation of the fishing rod in the circumferential direction can be reduced or prevented. Additionally, since the corners 31 are disposed on both sides of the upper surface 30 respectively, the fishing rod is unlikely to rotate in the circumference direction in a state in which the right arm is placed on the upper surface 30. Additionally, the position of the upper surface 30 is easily grasped due to the pair of left and right corners 31, and thus, the right arm is easily placed on the upper surface 30. Since the right arm can be properly placed on the upper surface 30, the orientation of the fishing rod in the circumferential direction is stabilized.

The pair of corners 31 is located radially outward relative to and higher than the top 20a of the main portion 20 the rearward of the rear grip portion 21. Meanwhile, the pair of corners 31 is the portion that is most distant from the centerline 4 of the main portion 20 in the radial direction, and more distant from the centerline 4 of the main portion 20 in the radial direction than the lowermost top 20a of the rear grip portion 21 in a transverse sectional view. For that reason, even if the main portion 20 of the second rod blank 3 is relatively thin, the right arm can be easily placed on the upper surface 30. Additionally, the rotation of the rear grip portion 21 in the circumferential direction can be easily suppressed by the right arm. Specifically, upward expansion amount B1 of the rear grip portion 21 is larger than the downward expansion amount B2 in the rearward of the rear grip portion 21. For that reason, even if the main portion 20 of the second rod blank 3 is relatively thin, the right arm can be easily placed on the upper surface 30.

Figure 12:
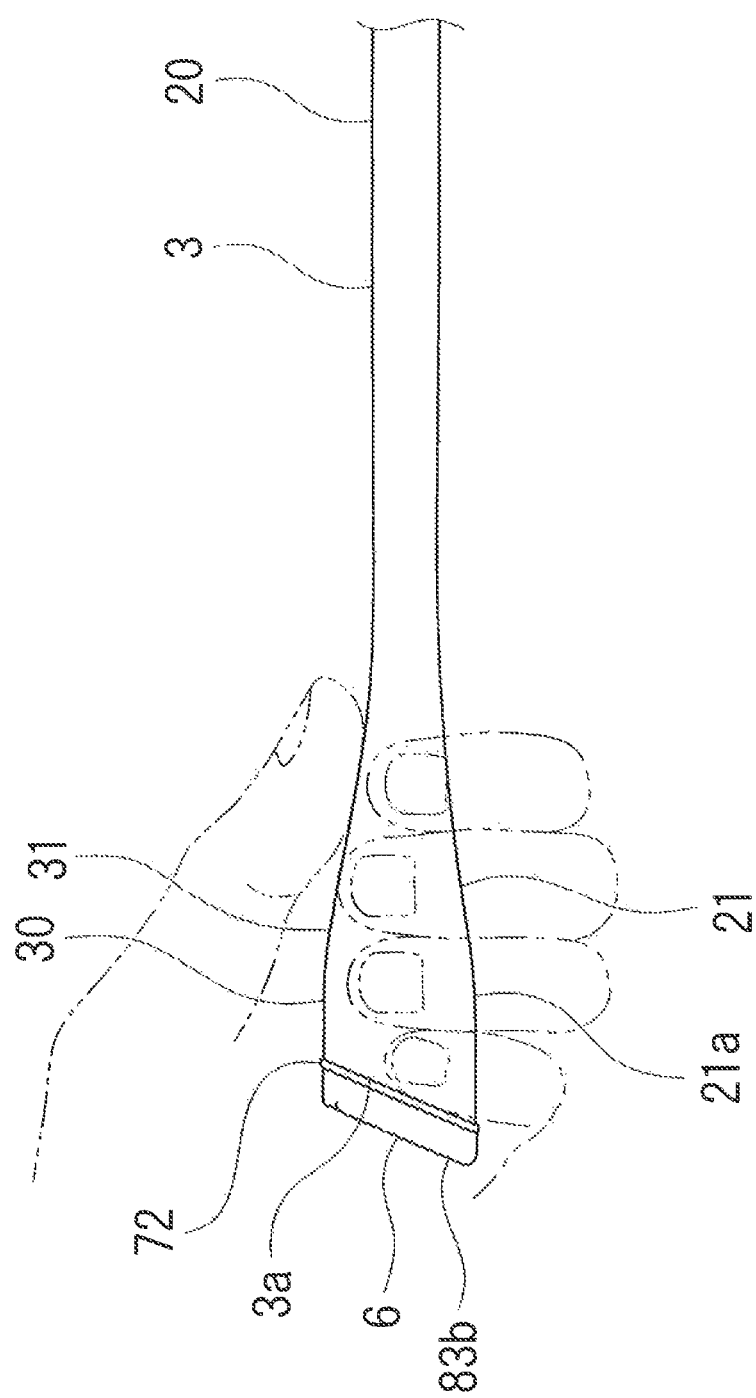
FIG. 12 is a rear view of the relevant part showing a state in which the fishing rod is being used.
Figure 13:
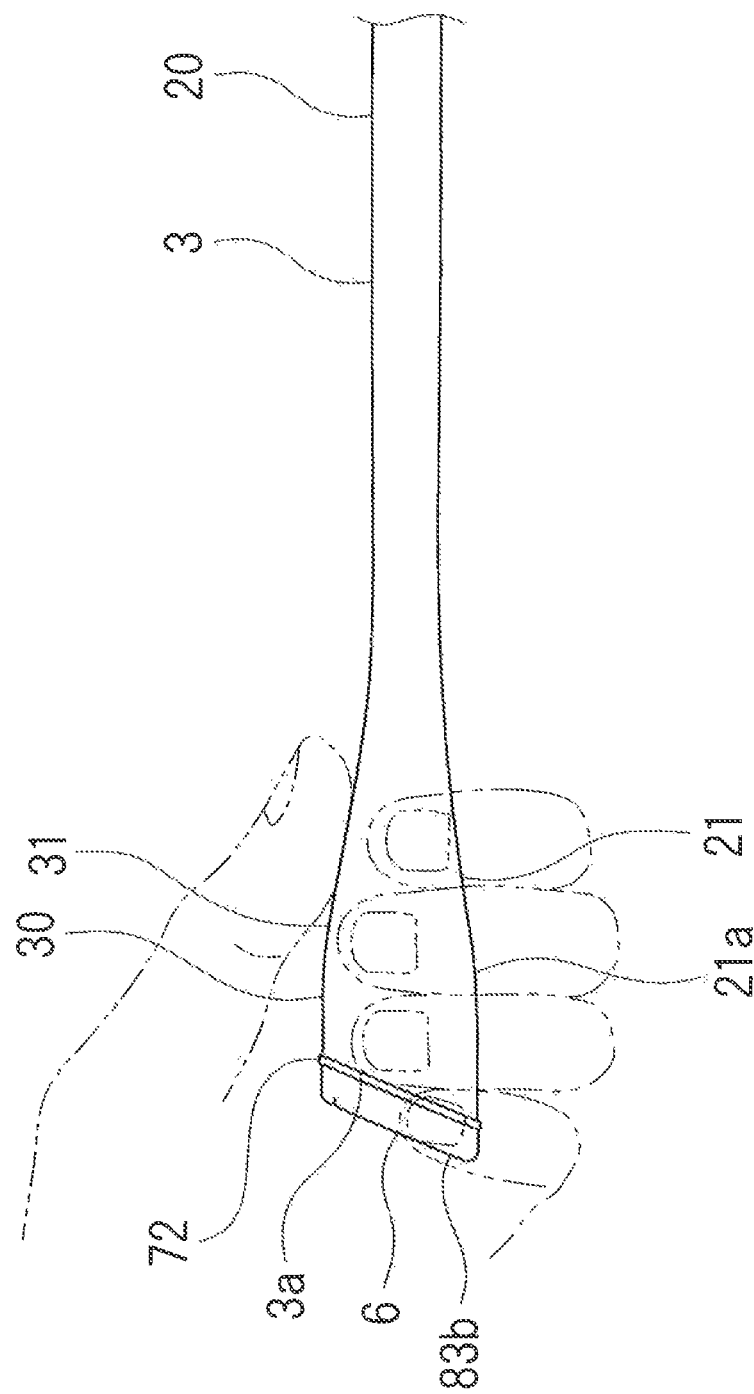
FIG. 13 is a rear view of the relevant part showing a state in which the fishing rod is being used.

When performing a double-handed casting, as shown in FIGS. 12 and 13, the rear grip portion 21 is held by a left hand. As shown in FIGS. 12 and 13, the thumb abuts against the upper surface 30. As shown in FIG. 12, four fingers of the index finger, the middle finger, the ring finger and the little finger can contact and hold the lower portion of the rear grip portion 21. Since there is a step between the second rod blank 3 and the flange 72 of the end cap 6, the little finger can be positioned in front of the step. With the step as a catch, slippage of the little finger to rearward can be prevented. Since the transverse sectional shape of the rear grip portion 21 is an inverted triangle, the joints of the fingers, such as the index finger, can be positioned on the lowermost top 20a of the rear grip portion 21. Therefore, the lower portion of the rear grip portion 21 can be sandwiched from left and right by the fingers, e.g., the index finger. Additionally, as shown in FIG. 13, it is possible for the three fingers from the index finger to the ring finger to contact the lower portion of the rear grip portion 21 to lightly hold the rear grip portion 21. In this embodiment, the ring finger can be placed on the step.

In this manner, when the rear grip portion 21 is held by the left hand, it is possible to easily grasp the orientation of the fishing rod in the circumferential direction by the pair of corners 31. Also, the thumb can abut against the upper surface 30. As such, when performing a double-handed casting, the fishing rod can be easily aligned in a predetermined direction and the casting can be performed accurately. Additionally, the left hand is unlikely to be displaced on the rear grip portion 21 in the circumferential direction due to the corners. Thus, it is possible to hold the rear grip portion and to cast with a small force.

The rear end surface 3a of the second rod blank 3 is inclined such that the lower side is farther rearward than the upper side and the lowermost top 20a of the rear grip portion 21 extends more rearward than the upper surface 30. Therefore, even if the length of the rear grip portion 21 is short, it is possible to place many fingers on the lowermost top 20a of the rear grip portion 21. Meanwhile, by making the rear grip portion 21 short, it is possible to reduce the weight of the rear grip portion 21, and thus, the weight of the fishing rod can be reduced.

The rear surface 83b of the guard wall 83 of the end cap 6 is inclined such that the lower side is farther rearward than the upper side. As such, the fishing rod can be smoothly inserted into a rod holder or a fishing rod bag. Additionally, the end cap 6 is an inverted triangle and the end cap 6 thins towards the lowermost part of the end cap 6. That is, the lowermost part of the end cap 6 has a sharply pointed shape which is slanted towards the rear side and the lower side. As such, the rear end portion of the fishing rod can be smoothly inserted into the rod holder or the fishing rod bag. Also, since the rear surface 83b of the guard wall 83 of the end cap 6 is inclined, it is possible to easily grasp the orientation of the fishing rod in the circumferential direction.

The projection amount of the guard wall 83 gradually increases towards the lower side and is at a maximum at the lowermost point 83a of the guard wall 83, and thus, the guard wall 83 can effectively protect the lowermost point of the rear end surface 3a of the second rod blank 3. Also, the lowermost point of the end cap 6 can be effectively protected by the guard wall 83. The width of the guard wall 83 gradually widens towards the lower side and is at a maximum at the lowermost point 83a of the guard wall 83, and thus, the guard wall 83 can effectively protect the lowermost point of the rear end surface 3a of the second rod blank 3 and the lowermost point of the end cap 6.

The inclined angle θ3 of the base surface 84 is smaller than the inclined angle θ2 of the rear surface 83b of the guard wall 83, therefore, the projection amount of the guard wall 83 can be easily increased towards the lower side without excessively increasing the thickness. The front end surface 70a of the cylinder part 70 of the end cap 6 is inclined such that the lower side is farther rearward than the upper side, and thus, the weight of the cylinder part 70 can be reduced while the cylinder part 70 holds the second rod blank 3.

Figure 14:
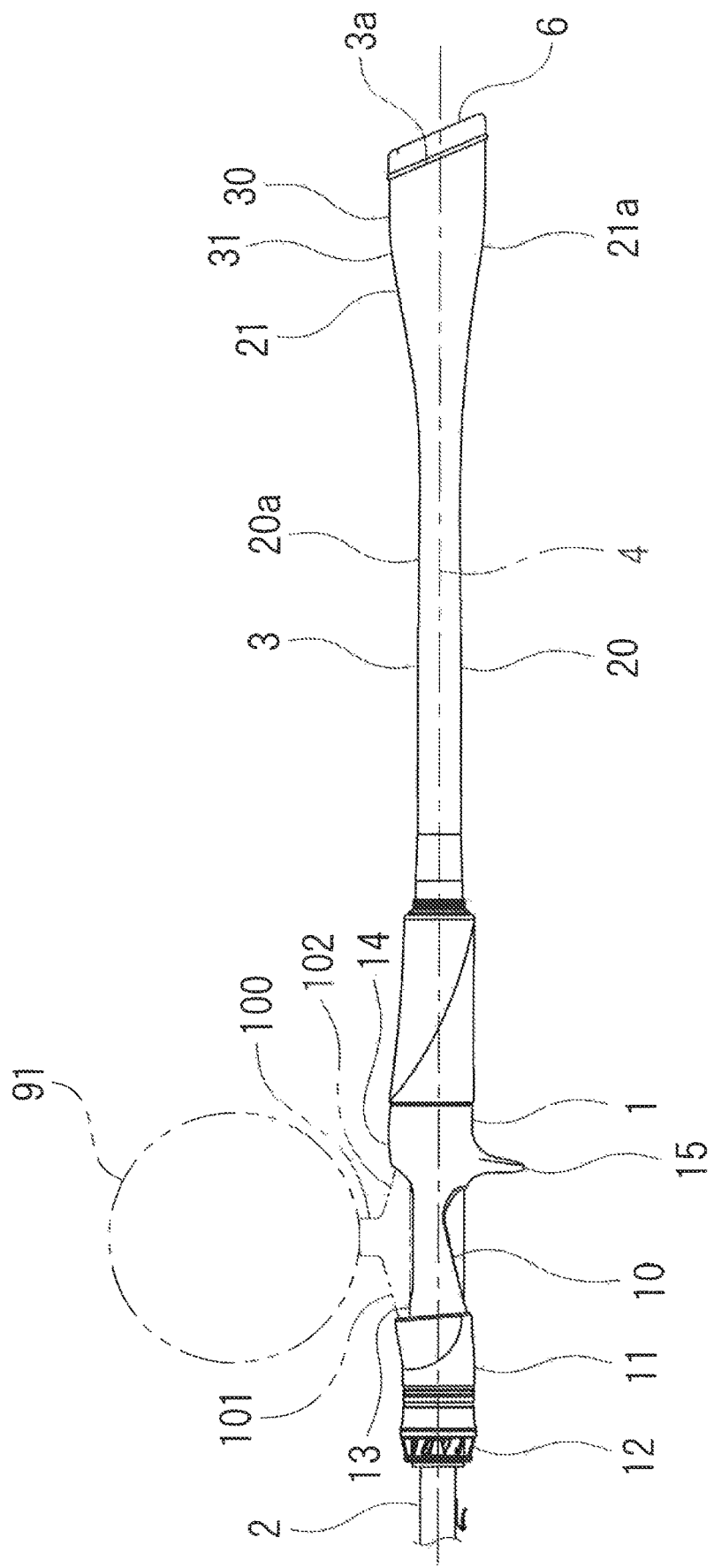
FIG. 14 is a front view showing the relevant part of the fishing rod in other embodiment of the present invention.

Also, as shown in FIGS. 14A and 14B, embodiments of the present invention can be directed to a fishing rod which is suitable for attaching a double bearing reel 91. In this embodiment, the reel mounting surface 13 faces upward and the double bearing reel 91 is positioned on the upside of the fishing rod. In this embodiment, the reel mounting surface 13 side is the upside and the radially opposite side of the reel mounting surface 13 is the downside. The reel seat 1 includes a trigger 15 for hooking a finger. The trigger 15 is located on the opposite side of the reel mounting surface 13. The trigger 15 projects towards the downside. With the double bearing reel 91, the upside is the reel mounting side and the downside is the radially opposite side of the reel mounting side.

Figure 15:
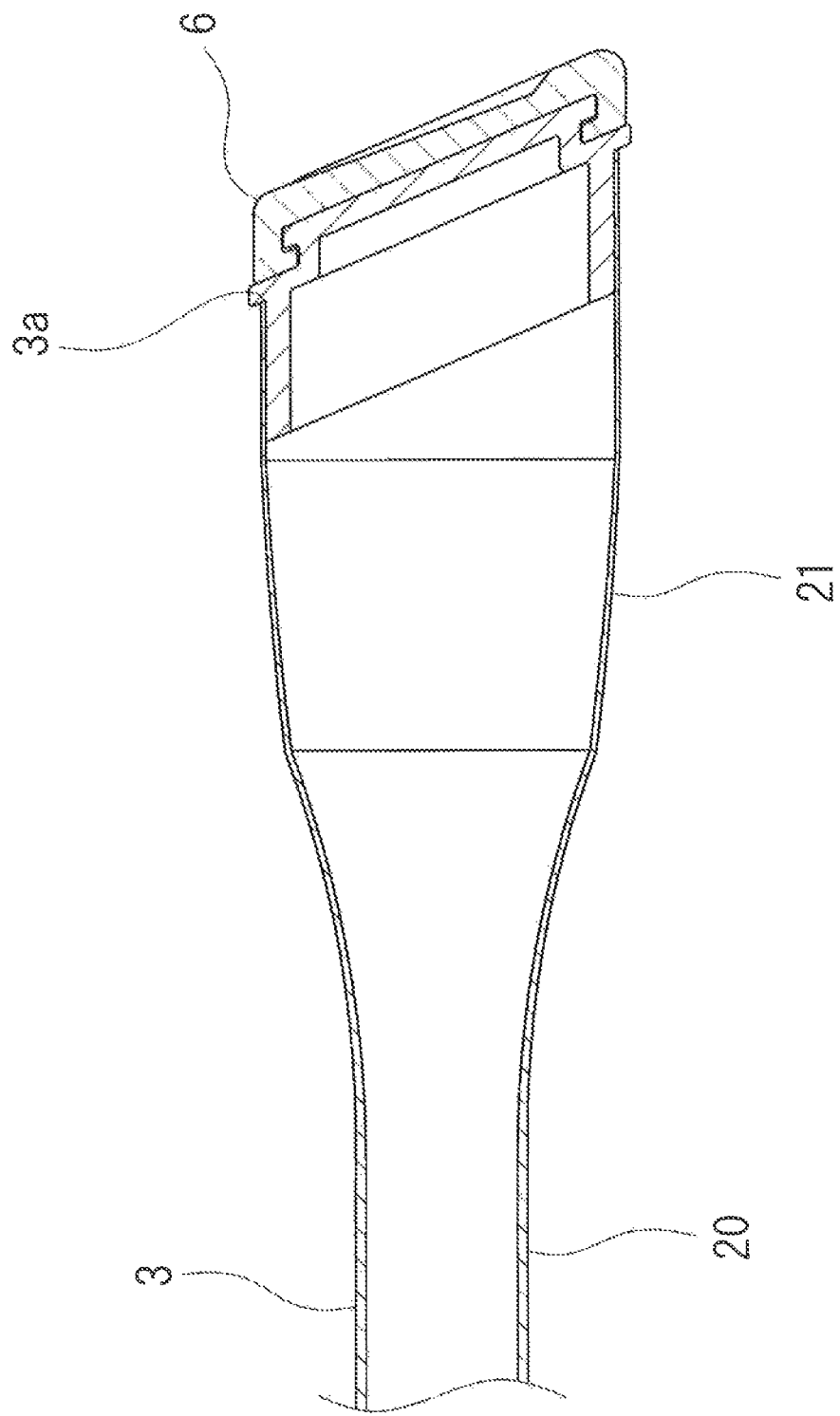
FIG. 15 is a longitudinal sectional view of the relevant part of the fishing rod in other embodiment of the present invention.

In some embodiments, the transverse sectional shape of the rear grip portion 21 can be circular. It is still preferable that the rear end surface 3a of the second rod blank 3 is inclined as shown in FIGS. 15 and 16, even when the transverse sectional shape of the rear grip portion 21 is circular. As can be understood, when the rear end surface 3a of the second rod blank 3 is inclined, many fingers can abut the lower portion of the rear grip portion 21. Therefore, it is possible to shorten the length of the rear grip portion 21 and thus, the weight of the rear grip portion 21 can be reduced.

When the rear end surface of the end cap 6 is an inclined surface inclined such that the lower side is farther rearward than the upper side, the rear end surface 3a of the second rod blank 3 can be an plane orthogonal to the centerline 4 of the main portion 20 without being inclined. Thus, even when the length of the rear grip portion 21 is shortened, the ring finger or the little finger, for example, can abut the lower portion of the end cap 6 and the short rear grip portion 21 can be supplemented with the lower portion of the end cap 6. The front end surface 70a of the cylinder part 70 of the end cap 6 can be inclined such that the upper side is farther rearward than the lower side or can be a plane orthogonal to the centerline 4 of the main portion 20.

What is claimed is:

1. A fishing rod including a rod blank to which a reel is configured to be attached and an end cap attached to an end portion of the rod blank on a rod end side, comprising:
   the rod blank having a main portion and a rear grip portion at the rod end side relative to the reel, and
   an end surface of the end cap on the rod end side including a base surface and a rear surface of a guard wall disposed around the base surface so as to form a generally U-shape or V-shape, the base surface being inclined at a first angle such that a lower side of the base surface extends farther in a rearward direction of the rod than an upper side of the base surface, the rear surface of the guard wall being inclined at a second angle different from the first angle such that a lower side of the rear surface of the guard wall extends farther in the direction of the rod end side than an upper side of the rear surface of the guard wall, and the base surface being recessed relative to the rear surface, such that opposing portions of sides of the guard wall taper from a lowermost point of the guard wall towards the upper side of the rear surface.

2. The fishing rod according to claim 1, wherein
   the end cap has a general shape of a single inverted triangle when viewed from a rear side along a longitudinal axis of the rod.

3. The fishing rod according to claim 2, wherein
   a longitudinal center of the rod is disposed within the inverted triangle.

4. The fishing rod according to claim 2, wherein
   vertices of the triangle are disposed adjacent a surface of the rod.

5. The fishing rod according to claim 1, wherein
   the width of the guard wall gradually widens towards the lower side.

6. The fishing rod according to claim 1, wherein
   the first angle of the base surface is inclined relative to a plane orthogonal to a centerline of the main portion is smaller than the second angle of the surface of the guard wall with respect to the orthogonal plane.

7. The fishing rod according to claim 1, wherein
   the rod blank is configured to have the reel attached to a lower side of the rod blank.

8. The fishing rod according to claim 1, wherein
   the rod blank is configured to have the reel attached to an upper side of the rod blank.

9. A fishing rod having a rod blank which is configured to be attached to a reel, comprising:
   an end cap; and
   the rod blank including a main portion and a rear grip portion which is continuous to a rod end side of the main portion, and
   an end surface of the rod blank on the rod end side attachable to the end cap, the end cap including a base surface and a rear surface of a guard wall disposed around the base surface so as to form a generally U-shape or V-shape, the base surface being inclined at a first angle such that a lower side of the base surface extends farther in a rearward direction of the rod than an upper side of the base surface, and the rear surface of the guard wall being inclined at a second angle different from the first angle such that a lower side of the rear surface of the guard wall extends farther in the direction of the rod end side than an upper side of the rear surface of the guard wall, and the base surface being recessed relative to the rear surface, such that opposing portions of sides of the guard wall taper from a lowermost point of the guard wall towards the upper side of the rear surface.

10. The fishing rod according to claim 9, wherein
    the end cap has a general shape of a single inverted triangle when viewed from a rear side along a longitudinal axis of the rod.

11. The fishing rod according to claim 10, wherein
    a longitudinal center of the rod is disposed within the inverted triangle.

12. The fishing rod according to claim 10, wherein
    vertices of the triangle are disposed adjacent a surface of the rod.

13. The fishing rod according to claim 9, wherein
    the end cap is attached to an end portion of the rod blank on the rod end side.

14. The fishing rod according to claim 9, wherein
    the width of the guard wall gradually widens towards the lower side.

15. The fishing rod according to claim 9, wherein
    the first angle of the base surface relative to a plane orthogonal to a centerline of the main portion is smaller than the second angle of the rear of the guard wall with respect to the orthogonal plane.

16. The fishing rod according to claim 9, wherein
    the rod blank is configured to have the reel attached to a lower side of the rod blank.

17. The fishing rod according to claim 9, wherein
    the rod blank is configured to have the reel attached to an upper side of the rod blank.

* * * * *